(12) United States Patent
Sloan et al.

(10) Patent No.: US 9,181,880 B2
(45) Date of Patent: Nov. 10, 2015

(54) FUEL TANK FILL CAP WITH IGNITION DISCONNECT

(71) Applicant: AGILITY FUEL SYSTEMS, INC., Fontana, CA (US)

(72) Inventors: Todd Sloan, Kelowna (CA); Chris Forsberg, Kelowna (CA); Jason Laycock, Kelowna (CA)

(73) Assignee: AGILITY FUEL SYSTEMS, INC., Fontana, CA (US)

( * ) Notice: Subject to any disclaimer, the term of this patent is extended or adjusted under 35 U.S.C. 154(b) by 0 days.

(21) Appl. No.: 13/843,041

(22) Filed: Mar. 15, 2013

(65) Prior Publication Data

US 2013/0291825 A1    Nov. 7, 2013

Related U.S. Application Data

(60) Provisional application No. 61/612,902, filed on Mar. 19, 2012.

(51) Int. Cl.
| | |
|---|---|
| *B60K 15/05* | (2006.01) |
| *F02D 17/04* | (2006.01) |
| *B60K 15/04* | (2006.01) |
| *B60K 15/03* | (2006.01) |

(52) U.S. Cl.
CPC .......... *F02D 17/04* (2013.01); *B60K 15/0406* (2013.01); *B60K 2015/03375* (2013.01); *B60K 2015/0493* (2013.01)

(58) Field of Classification Search
CPC .......... F02B 77/00; F02D 17/04; F02D 43/00

USPC .................. 123/198 DC, 198 D, 406.13, 630; 296/97.22; 220/86.2, DIG. 33; 141/348–350
See application file for complete search history.

(56) References Cited

U.S. PATENT DOCUMENTS

| | | | | |
|---|---|---|---|---|
| 3,572,305 | A | * | 3/1971 | Morange ................ 123/146.5 R |
| 3,759,075 | A | * | 9/1973 | Lipschutz ........................ 70/159 |
| 3,885,547 | A | | 5/1975 | Doepke et al. |
| 4,030,322 | A | | 6/1977 | Pettit |
| 5,720,327 | A | | 2/1998 | Foster, Jr. |
| 6,112,714 | A | | 9/2000 | Blister |
| 6,285,934 | B1 | * | 9/2001 | Shaw ................................ 701/36 |
| 6,575,131 | B2 | * | 6/2003 | Brister ...................... 123/198 D |

(Continued)

FOREIGN PATENT DOCUMENTS

| | | | |
|---|---|---|---|
| JP | 2004-066901 A | | 3/2004 |
| KR | 20010016775 A | * | 3/2001 ............. F02D 43/00 |

(Continued)

OTHER PUBLICATIONS

KR20010016775A, Machine translation, pp. 1-7.*

(Continued)

*Primary Examiner* — Lindsay Low
*Assistant Examiner* — Grant Moubry
(74) *Attorney, Agent, or Firm* — Wilson Sonsini Goodrich & Rosati

(57) ABSTRACT

The invention provides devices, systems and methods for filling, capping and electronically monitoring the closure of a fuel tank. In some embodiments, the invention provides devices, systems and methods for filling, capping and providing an ignition disconnect mechanism upon uncapping of a natural gas fuel tank.

27 Claims, 11 Drawing Sheets

(56) References Cited

U.S. PATENT DOCUMENTS

| | | |
|---|---|---|
| 6,843,237 B2 | 1/2005 | Bowen et al. |
| 7,322,337 B1 * | 1/2008 | Brister et al. ............ 123/198 D |
| 7,322,338 B1 * | 1/2008 | Brister et al. ............ 123/198 D |
| 7,841,315 B1 * | 11/2010 | Brister et al. ............ 123/198 D |
| 8,210,306 B2 * | 7/2012 | Zuck et al. .................... 180/271 |
| 2002/0170617 A1 | 11/2002 | Veenstra et al. |
| 2004/0094230 A1 * | 5/2004 | Ono et al. ..................... 141/286 |
| 2008/0251153 A1 | 10/2008 | Bell et al. |
| 2009/0126827 A1 | 5/2009 | Guendouz et al. |
| 2011/0197988 A1 * | 8/2011 | Van Vliet et al. ................. 141/1 |

FOREIGN PATENT DOCUMENTS

| | | |
|---|---|---|
| WO | WO 01/40637 A1 | 6/2001 |
| WO | WO 2005/084987 A1 | 9/2005 |

OTHER PUBLICATIONS

International search report and written opinion dated Jul. 1, 2013 for PCT/US2013/033029.

* cited by examiner

FUEL TANK FILL CAP WITH IGNITION DISCONNECT

CROSS-REFERENCE

This application claims the benefit of U.S. Provisional Patent Application Ser. No. 61/612,902, filed Mar. 19, 2012, which application is entirely incorporated herein by reference.

BACKGROUND OF INVENTION

Safety and reliability requirements for alternative fuel systems for vehicles include considerations for filling, storage and delivery of on-board fuel supply. Handling of different fuels may impose different requirements on each fuel system. Challenges remain concerning safety and reliability of filler assemblies on natural gas and other alternative fuel tanks.

SUMMARY OF INVENTION

Recognized herein is the need for improved fuel tank fill systems.

The invention provides devices, systems and methods for filling, capping and electronically monitoring the closure of a fuel tank. Some embodiments provide systems and methods for filling, capping and providing an ignition disconnect mechanism upon uncapping of a natural gas fuel tank.

Aspects of the invention relate to a vehicle fuel tank fill cap comprising an electric wire embedded in the fill cap, and a mating feature on the fill cap, wherein the mating feature on the fill cap is configured to be connected and separated in a controlled manner, by a vehicle operator, with a complementary mating feature on a fill neck of a fill receptacle at a vehicle, and wherein the electric wire embedded in the fill cap completes, when the fill cap is connected with the fill neck of the fill receptacle, a control circuit capable of disconnecting a vehicle engine ignition system when an open circuit condition exists at the control circuit.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF INVENTION

The invention provides devices, systems and methods for filling, capping and electronically monitoring the closure of a fuel tank. In some embodiments, the invention provides devices, systems and methods for filling, capping and providing an ignition disconnect mechanism upon uncapping of a natural gas fuel tank. Various aspects of the invention described herein may be applied to any of the particular applications set forth below or in any other type of fuel storage/delivery setting. The invention may be applied as a standalone method or system, or as part of an integrated fuel storage/delivery system. It shall be understood that different aspects of the invention can be appreciated individually, collectively, or in combination with each other.

Figure 1A:
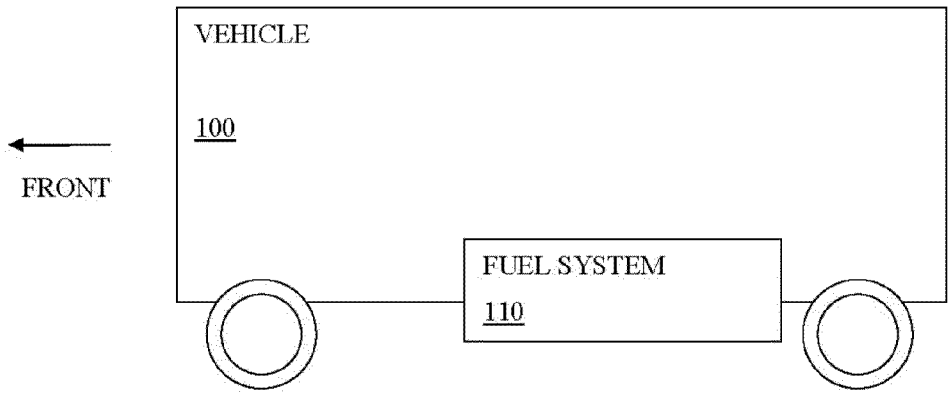
FIG. 1A is a schematic of a fuel system carried on board a vehicle.

FIG. 1A is a schematic of a vehicle 100 with a fuel system 110 mounted thereon. A vehicle 100 may be any type of vehicle known in the art. A vehicle may be a truck, such as a light duty truck (e.g., class 1, class 2 or class 3), medium duty truck (e.g., class 4, class 5 or class 6), or heavy-duty truck (e.g., class 7 or class 8). In some embodiments, the vehicles may be cars, wagons, vans, buses, high-occupancy vehicles, dump trucks, tractor trailer trucks, transit, refuse or heavy-duty vehicles, or any other vehicles. The vehicle may have any weight. For example, the vehicle may weigh more than or equal to about 5000 lbs, 7,500 lbs, 10,000 lbs, 12,500 lbs, 15,000 lbs, 17,500 lbs, 20,000 lbs, 22,500 lbs, 25,000 lbs, 30,000 lbs, or 35,000 lbs.

The fuel system 110 may be mounted to the vehicle in various configurations. For example, in a side mount configuration, a fuel system 110 may be installed on the side of the vehicle frame rail (not shown). Fuel systems may be installed on one or both sides of the vehicle, providing, for example, standard fuel capacities, measured in diesel gallon equivalents (DGE), of 40 DGE, 60 DGE or 80 DGE. In another example, in a behind-the-cab configuration, a fuel system 110 may be installed behind the cab on the vehicle frame rail, providing, for example, standard fuel capacities of 45 DGE, 60 DGE, 75 DGE or 100 DGE. In a further example, in a roof mount configuration, a fuel system 110 may be installed on the roof of the vehicle body or in a custom integration, providing a wide range of customizable fuel capacities. In an additional example, in a front-of-the-body configuration, a fuel system 110 may be installed in front of the vehicle body, providing, for example, standard fuel capacities of 60-75 DGE.

A vehicle 100 may be propelled by a fuel, including, but not limited to, compressed natural gas (CNG), liquefied natural gas (LNG), liquefied petroleum gas (LPG), dimethyl ether (DME), methanol, ethanol, butanol, Fischer-Tropsch (FT) fuels, hydrogen or hydrogen-based gas, hythane, HCNG, syngas and/or other alternative fuels or fuel blends. For example, natural gas in the form of CNG or LNG may be an alternative fuel of choice for transit, refuse, and many other heavy-duty vehicles.

The fuel may be stored as a compressed gas, as a liquefied gas or as a liquid under its own vapor pressure. The fuel may be stored in an on-board fuel system 110, comprising a fuel tank, vessel, or any other type of device capable of containing a fuel in compressed gas, liquefied gas or liquid form. Any description of a fuel tank herein may also be applied to other types of fuel containing devices.

The fuel tank may be configured in accordance with the chosen fuel storage mode. For example, compressed gases, such as CNG, may require that the fuel tank be outfitted with adequate high pressure components (e.g., high pressure seals, relief valves, compression devices), wherein high-strength and lightweight materials may allow CNG pressures up to, for example, 3,600 psig. In another example, liquefied gases, such as LNG, may require that the fuel tank be outfitted with adequate liquefaction components (e.g., coolers, liquid-vapor separators, insulation). LNG systems may operate at pressures of, for example, 0 psig, 50 psig, 100 psig, 150 psig, 200 psig, 250 psig, 300 psig, or 350 psig and temperatures of, for example, −259° F., −223° F., −200° F., −186° F., −175° F., −167° F., −158° F., or −150° F., requiring the use of cryogenic (about −260° F.) piping systems and vacuum-insulated storage tanks.

In some embodiments, a vehicle 100 may contain a single fuel tank. In other embodiments, the vehicle may contain a plurality of fuel tanks. The tanks may or may not have the same characteristics. The tanks may be mounted to any portion of the vehicle. In some embodiments, the tanks may be mounted to a side of the vehicle. One, two, or more tanks may be mounted on a single side of the vehicle, or on each side of the vehicle. The side-mounted tanks may at least partially protrude from a side surface of the vehicle.

The one or more fuel tanks may provide storage for a predetermined amount, or capacity, of fuel. For example, for natural gas measured in diesel/gasoline gallon equivalents (where 1 gasoline gallon equivalent (GGE)=standard cubic feet (SCF) of natural gas divided by 123 , and 1 diesel gallon equivalent (DGE)=standard cubic feet (SCF) of natural gas divided by 139), the amount of fuel provided on board the vehicle may be, for example, up to about 28 DGE, 45 DGE, 52 DGE, 60 DGE, 63 DGE, 70 DGE, 75 DGE, 80 DGE, 88 DGE, 92 DGE, 140 DGE, 100 DGE, 105 DGE, 176 DGE, more than 176 DGE.

The fuel tank may have any size, shape and/or weight. For example, the fuel tank may be larger than, smaller than, or about the same size as a 5 gallon tank, 7 gallon tank, 10 gallon tank, 15 gallon tank, 20 gallon tank, 25 gallon tank, 30 gallon tank, 40 gallon tank, 50 gallon tank, or 70 gallon tank. The fuel tank may weigh more than, less than, or equal to about 0.01 tons, 0.03 tons, 0.05 tons, 0.07 tons, 0.1 tons, 0.2 tons, 0.3 tons, 0.5 tons, 0.7 tons, or 1.0 tons. For example, the fuel tanks may be of cylindrical form with dimensions (radius in inches x length in inches) of, for example, 25"×61", 25"×80", 25"×90", 26"×80", 26"×90", 26"×120", 26"×76", 16"×80", 21"×86", 16"×120", 21"×70", 21"×86", and one or more cylinders may be combined to achieve a predetermined total fuel capacity.

The fuel system 110 may be capable of containing a fuel at a predetermined pressure. For example, the fuel system 110 may be capable of containing a fuel having a pressure of less than or equal to about 10000 psig, 8000 psig, 7000 psig, 6500 psig, 6000 psig, 5500 psig, 5000 psig, 4750 psig, 4500 psig, 4250 psig, 4000 psig, 3750 psig, 3500 psig, 3250 psig, 3000 psig, 2750 psig, 2500 psig, 2000 psig, 1500 psig, 1000 psig, 500 psig, 300 psig, 100 psig, or less.

The fuel system 110 may have one or more fuel outputs. The fuel output may transfer the fuel to another part of the vehicle 100, such as an engine. In one example, the fuel may be output to mix with air in the cylinder of an engine. The fuel may be used in the process of propelling the vehicle. Further, the fuel system 110 may have one or more fuel inputs. The fuel inputs may transfer the fuel from an external fuel supply to another part of the vehicle 100, such as the one or more on-board fuel tanks.

Figure 1B:
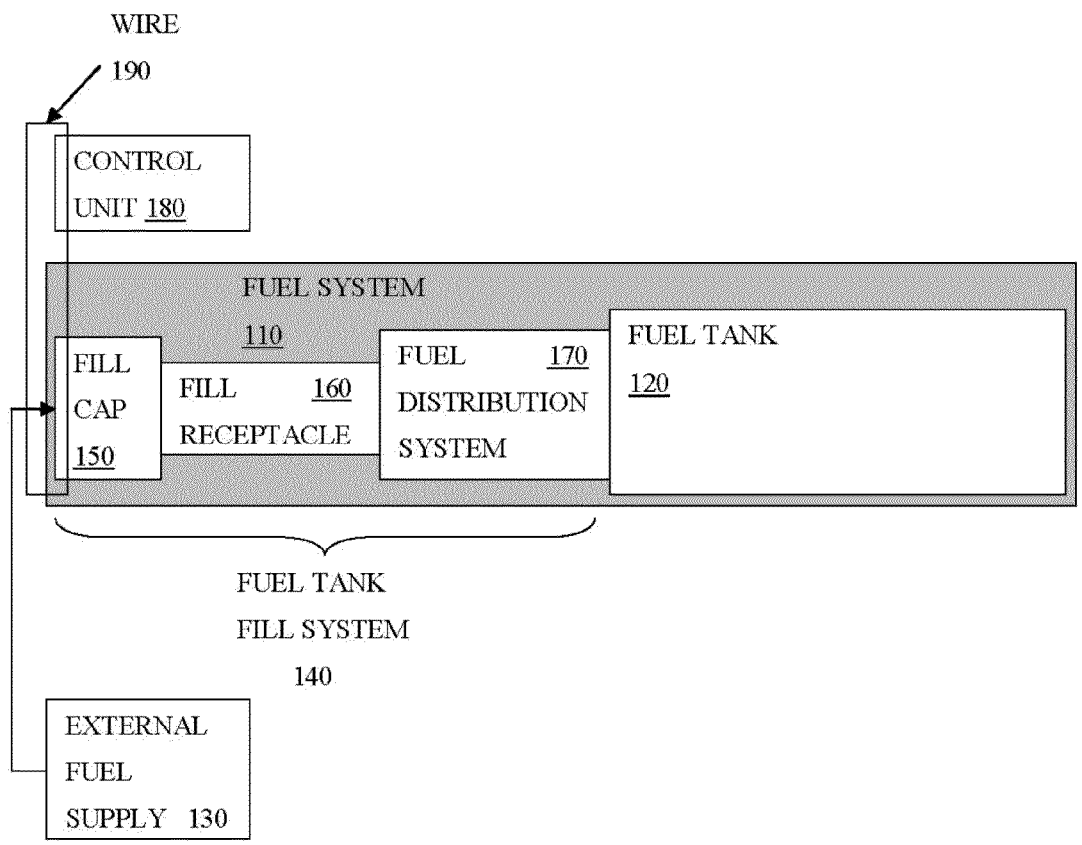
FIG. 1B is a schematic of a fuel system.

FIG. 1B is a schematic of the fuel system 110. The fuel system 110 may comprise a fuel tank 120 into which fuel from an external fuel supply 130 is supplied through a fuel tank fill system 140. The fuel fill system may comprise a fill cap 150 removably connected to a fill receptacle 160. In some embodiments, the fill receptacle 160 may be in communication with the fuel tank 120 via a fuel distribution system 170. The fuel system may further be in electronic communication with a control unit 180 via an indicator (e.g. a wire) 190. The fuel system may be housed in a cover (not shown), which may be mounted to the vehicle, and may serve to contain and protect the fuel tank 120 and other fuel system components. The cover may be made of a variety of materials, including, but not limited to, metal or metal alloys (e.g., steel, iron, aluminum, titanium, copper, brass, nickel, silver, or any alloys or combinations thereof, composite materials (e.g., carbon fiber, fiberglass), or polymer materials. The cover may be made of a single material or may comprise multiple pieces made of different materials.

One or more fuel systems 110 may be provided on board the vehicle. For example, a vehicle having multiple fuel tanks 120 may have multiple fuel tank fill systems provided at each fill location on the vehicle. For example, a vehicle may have one or more fill locations, such as near the driver-side vehicle door, in the rear of the vehicle, on the roof of the vehicle etc. In another configuration, each fuel tank 120 may be accessed via multiple fuel tank fill systems 140, i.e., each fuel tank may have multiple inlets. Further, each fuel tank fill system 140 may or may not comprise a fuel distribution system 170. Thus, one or more fill locations may include a fill cap 150 removably connected to a fill receptacle, wherein the fill receptacle may be connected directly to the fuel tank 120.

The fuel system 110 may be used to provide fuel to the fuel tank 120. The fuel system 110 may also be used to provide fuel from the fuel tank 120 to, for example, the vehicle engine. Fuel to and/or from the fuel tank may be transferred using a fuel distribution system 170. The fuel distribution system 170 may comprise one or more flow transfer components, one or more flow conditioning components and/or one or more flow control components. For example, a flow distribution system 110 for CNG may comprise one, two, or more check valves at and/or downstream of the fill receptacle 160 along a gas flow path from the fill receptacle 170 to the fuel tank 120. The one or more check valves may ensure that gaseous fuel is transferred in one direction only (toward the fuel tank).

The fuel distribution system 170 may be rated at a predetermined pressure (e.g., 3600 psig) and may be required by law to include the one or more check valves. The gas may be transferred via standard gas flow components known in the art (e.g., standard stainless steel, brass or other suitable tubing, check valves, shutoff valves, solenoid valves, bleed valves, relief valves, pressure regulating valves, filters). Further, the fuel distribution system may or may not comprise a pressure manifold. The pressure manifold may include one or more gas inlets and/or outlets (e.g., from multiple fill receptacles, to multiple fuel tanks and/or engine manifold inlets), one or more bleed valves, one or more pressure transducers and/or additional flow components. In some embodiments, a fuel distribution system may comprise a fuel transfer line from the fill receptacle 160 to the fuel tank 120, and a fuel transfer line from the fuel tank 120 to the vehicle engine. The paths may or may not partially coincide, for example, by providing a single transfer flow path to the fuel tank and a tee connector or a 3-way valve to enable multiple transfer lines to feed fuel to and/or from the fuel tank.

The fuel distribution system 170 may further comprise a ¼ turn shutoff valve and/or other flow regulating device on one or more outlets from the pressure manifold and/or any transfer line regardless of the presence or absence of a pressure manifold. For example, a (manual) ¼ turn shutoff valve may be provided on the transfer line from the pressure manifold to the gas tank. In some embodiments, the fuel transfer line to the fuel tank may be bidirectional, i.e., the ¼ turn shutoff valve may allow flow in both directions. Alternatively, 3-way, 4-way or other valve types may be used.

One or more electronically-controlled shutoff valves, such as solenoid valves, may also be provided, for example, on the transfer line from the pressure manifold to the vehicle engine. Solenoid valves may be combined with other gas regulating valves, such as, for example, a pressure regulator downstream of the solenoid valve. For example, the transfer line to the vehicle engine (e.g., via the engine distribution manifold) may include a solenoid valve in series with a downstream pressure regulator.

The one or more solenoid valves may or may not be in electronic communication with the control unit 180. In some embodiments, the one or more solenoid valves may be in electronic communication with one or more other control units provided on the vehicle. The control unit 180 or another control unit may provide an electronic signal to the solenoid valve. For example, the solenoid valve may remain in a closed position until power is provided by a control unit to activate (i.e., open) the solenoid valve. In some cases, a flow measurement device may be provided that may close the solenoid valve if the fuel flow rate exceeds a predetermined value. Such closure of the solenoid valve may be further communicated to one or more control units.

Any control unit provided on the vehicle may have capability to send an audible or visual control signal (e.g., an alarm sound, or alarm symbol on the vehicle drive board) to the operator of the vehicle. Furthermore, any control unit provided on the vehicle may have capability of automatically providing one or more control signals to one or more other vehicle systems. Control unit signals and/or system actuation may be automatic. In some cases, control unit signals may prompt the vehicle operator (i.e., driver) to provide an input. The vehicle may be configured to allow automatic control, manual user control and/or a combination thereof.

The fuel tank fill system 110 may include one or more filters. The filters may be provided on a fuel transfer line from the fill receptacle to the pressure manifold, on a fuel transfer line from the pressure manifold to the fuel tank, on a fuel transfer line from the pressure manifold to the engine, on a fuel transfer line from the fill receptacle directly to the fuel tank, on a fuel transfer line from the fuel tank to the engine, etc. Any filter known in the art, including sieves, chemical adsorption and other inline filters, may be used.

In embodiments requiring cooling and/or insulation, such as in LNG fuel systems, the fuel system components may be appropriately outfitted with insulation, chillers and/or other components known in the art. For example, the fuel transfer lines and the fuel tank may be wound with insulation.

The control unit 180 may comprise one or more electronic control circuits, such as the control circuit including the wire 190. In some embodiments, one or more indicators (e.g., an actuators, a trigger, a magnet) and one or more indicator receivers (e.g., a read sensor) may be used instead or in addition to a wire control circuit. Thus, any description herein of control circuits having one or more wires may also be applied to control circuits having other types of indicator(s) and indicator receiver(s), and vice versa. Further, any description of components of the wire control circuit provided on the fill cap and/or in region(s) for receiving the fill cap, or functionality thereof, may also be applied to control circuits having other indicator(s) and/or indicator receiver(s), and vice versa. The control circuit 190 may electronically connect the fill cap 150 to the control unit 180 when the fill cap 150 is connected to the fill receptacle 160 (closed circuit). When the fill cap 150 is disconnected may correspond to an open circuit condition. The control unit 180 may actuate, electronically communicate with or otherwise control other systems on board the vehicle, such as, for example, a vehicle ignition system. In some embodiments, the control unit 180 may provide one or more control signals to the other vehicle systems based on the status of the control circuit 180. For example, the control unit 180 may disconnect the engine ignition system when a change in circuit condition exists at the control circuit 190 due to the fill cap 150 being disconnected from the fill receptacle 160. In one example, a change in a circuit condition may be a change from a closed circuit condition to an open circuit condition. Examples of responses to various circuit conditions include, for example, starting (e.g., connecting) one or more systems on board the vehicle, stopping (e.g., disconnecting) one or more systems on board the vehicle, controlling or actuating (e.g., continuously) one or more systems on board the vehicle in accordance with changes in circuit condition etc. In some cases, the open circuit condition may correspond to a stop or disconnect response, while in other cases, the open circuit condition may correspond to a start or connect response. Similarly, in some cases, the closed circuit condition may correspond to a start or connect response, while in other cases, the closed circuit condition may correspond to a stop or disconnect response. Further, start/connect and/or stop/disconnect responses may be triggered with a delay or upon a predetermined extent of change in circuit condition.

Figure 2A:
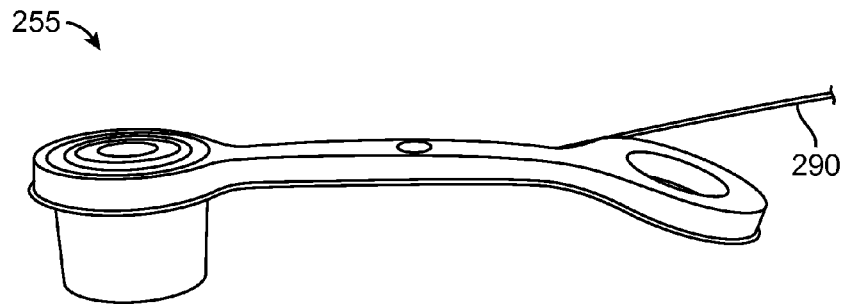
FIG. 2A is a photograph of an ignition disconnect rubber cap.

FIG. 2A is a photograph of an ignition disconnect rubber cap 255. The ignition disconnect rubber cap 255 is connected to a fill receptacle (not shown). In some cases, the ignition disconnect rubber cap 255 comprises a wire contact 290. The ignition disconnect rubber cap 255 can be pressed onto the fill receptacle (e.g., any fill receptacle 160, such as, for example, fill receptacle 464 in FIGS. 4A-C) in order to cap a fuel tank, and pulled off the fill receptacle to open access to a fuel tank. Connection between the ignition disconnect rubber cap 255 and the fill receptacle may easily be disrupted through mechanical means. Alternatively, air trapped between the rubber and the receptacle may expand due to heat absorbed at the rubber cap and cause the rubber cap to pop off the fill receptacle.

Figure 2B:
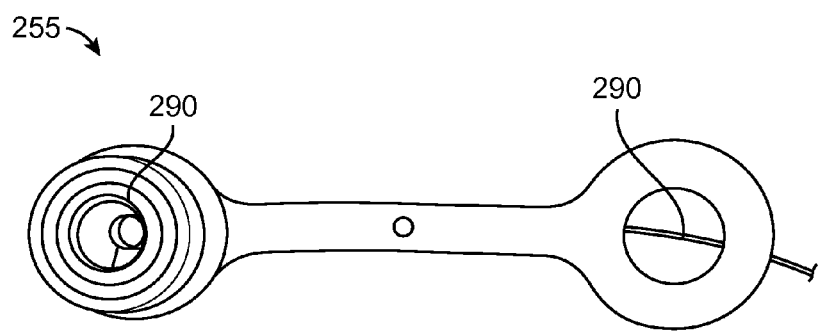
FIG. 2B is a photograph of an ignition disconnect rubber cap with embedded wire.

FIG. 2B is a photograph of an ignition disconnect rubber cap with an embedded wire 290 used to complete an ignition circuit. When the rubber cap 255 is connected to the fill receptacle (e.g., any fill receptacle 160, such as, for example, fill receptacle 464 in FIGS. 4A-C), the vehicle ignition is active and the vehicle engine can be started. If it is taken off, the vehicle ignition cannot be turned on. However, a need remains in providing an ignition disconnect cap that does not fall off when it is not supposed to. Improved systems and methods are needed in order to provide a secure connection to cover the fill receptacle.

Figure 3:
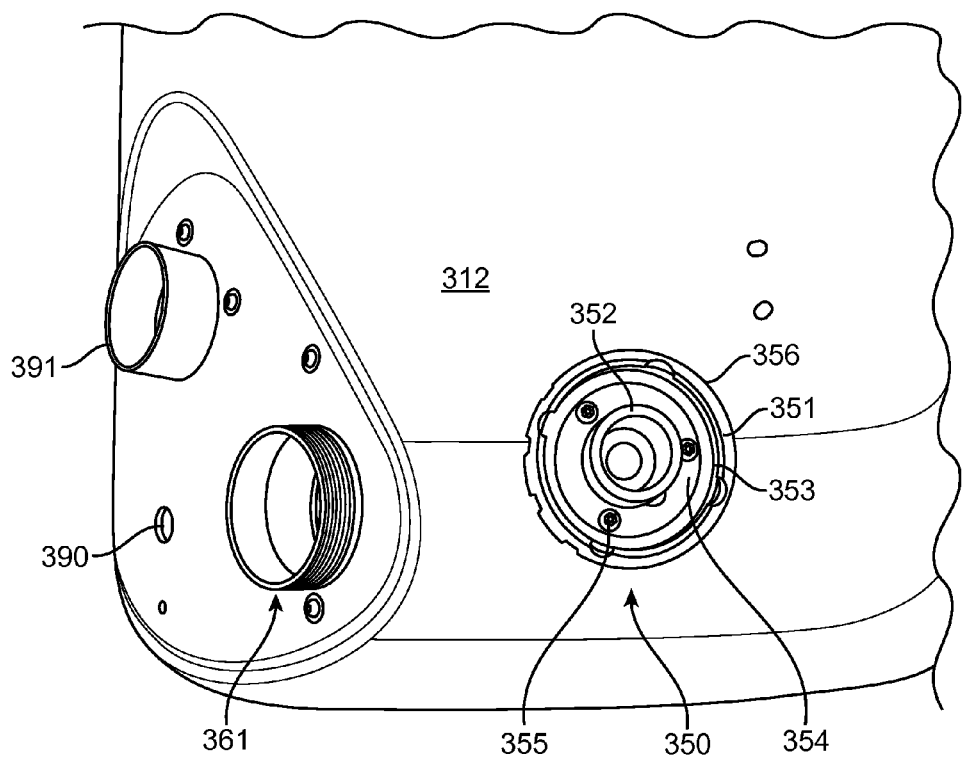
FIG. 3 is a photograph of a fuel tank cover with a fill receptacle in accordance with an embodiment of the present invention.

With reference to FIG. 3, an aspect of the invention relates to an ignition disconnect fill cap 350 with a mating fill receptacle that are part of a fuel system on board a vehicle. The mating fill receptacle may have an outer receptacle or fill neck 361. The fuel system may be housed in a cover 312, such as a cover made from a composite material. Components of the fuel system, including, but not limited to, the fill cap 350, the fill neck 361, a ¼ turn shutoff valve 390 (only the location of which is shown) and a pressure gauge receptacle 391, may be accessed by a vehicle operator from the outside of the cover 312. Further, access to a tank valve and/or other components may be provided elsewhere on the cover 312, such as, for example, on a side surface of the cover 312.

The fuel system may be arranged inside the cover 312 in a variety of ways. For example, in a side mount configuration on a vehicle frame rail, a fuel tank may reside in a portion of the cover 312 closest to a front wheel of the vehicle, while a fuel tank fill system may reside in a portion of the cover 312 near a rear wheel of the vehicle. Such an arrangement may be beneficial from a safety standpoint in a collision of the vehicle. Alternative arrangements of fuel system components inside the cover may also be used. For example, the fuel tank fill system may reside in a portion of the cover 312 nearest to the vehicle body, while less sensitive or more impact tolerant components of the fuel system may reside in a portion of the cover farther away from the vehicle body.

The fill neck 361 may be threaded into, molded together with, welded to, or integrated during composite forming of the cover 312. For example, the fill neck can be wound into the composite cover during forming. In some cases, the fill neck may be attached to a faceplate (e.g., faceplate 796 in FIGS. 7A-B), a fill manifold (e.g., fill manifold 463 in FIGS. 4A-C or fill manifold 563 in FIGS. 5A-D). The fill neck may have a fill cap receiving region. The fill cap receiving region may be a threaded connection on the fill neck 361, such as that shown in FIG. 3. In other embodiments, the fill cap receiving region may be separately formed, and permanently or removably mounted/attached to the fill neck 361 and/or the cover 312. Permanent attachment may be achieved by using screws, glue or adhesive, welded connections, solder, heat stakes or other permanent fastening approaches known in the art. Removable attachment may be achieved with suitable mating fasteners, including hooks, latches, grooves, snap fit features (e.g., mechanical or magnetic snap fit features), buttons, twist lock connections or other protrusions and features. In some cases, a compression fit may be achieved between components through suitable mechanical coupling means. In some embodiments, the fill cap receiving region and/or the fill neck 361 may be integrally formed with the cover 312.

Attachment of the fill cap may be accomplished by forming complementary mating features on the fill cap and on the fill cap receiving region. For example, grooves on a mating component may be female fittings complementary to one or more male fittings on a receiving component, and protrusions on a mating part may be male fittings meant to twist, slide, retractably click or otherwise connect to female receptacles on the receiving component. Complementary mating features may include, but are not limited to, extruded features (e.g., flanges, ledges, buttons, pins, brackets, latches, pins or other fasteners), receiving indents, locks, slots, snaps, brackets, collars, clips, clasps, flip handles and/or other features. The complementary mating features may enable secure attachment of the fill cap to the fill neck 361.

The fill cap 350 may be formed in a shape that is complementary to the fill neck 361. For example, the fill cap may be formed with a round cross-section with internal threads 351 that mate with external threads on the fill neck 361. The fill cap 350 may be formed in a shape that is complementary to other portions of the fill receptacle in addition to the fill neck 361. Further, the fill cap may be formed of a single piece or of one or more separate pieces joined together. For example, the fill cap 350 may comprise an outer cap 356, an inner cap 352, an o-ring or other type of seal 353 and a support plate 354. As described elsewhere herein (see, for example, FIGS. 5A-D), the fill cap may further comprise pins, latches, protrusions or other mating members for connecting to the fill neck 361. One or more fastening members, such as the screws 355, any type of bonding (e.g., adhesives, welded connections, solder, heat stakes), press-fits, snap fits, pins, or any other connecting means known in the art may be used to attach separate pieces together.

The fill cap 350 may be formed as concentric tubular pieces of round, square, rectangular, irregular or other cross-sections. The fill cap 350 may be formed of one, two, or more concentric tubular sections, which may be integrally or separately formed. The tubular assembly may be open on one end in the direction of connection with the fill neck 361. On its other end, the tubular assembly may be closed, thereby forming a cap. Alternatively, as described elsewhere herein, the fill cap 350 and the mating fill receptacle with the fill neck 361 may be formed in a substantially non-twist, non-tubular fashion, such as, for example, as a clip, a cam lock, a pin or a clasp.

Figure 4A:
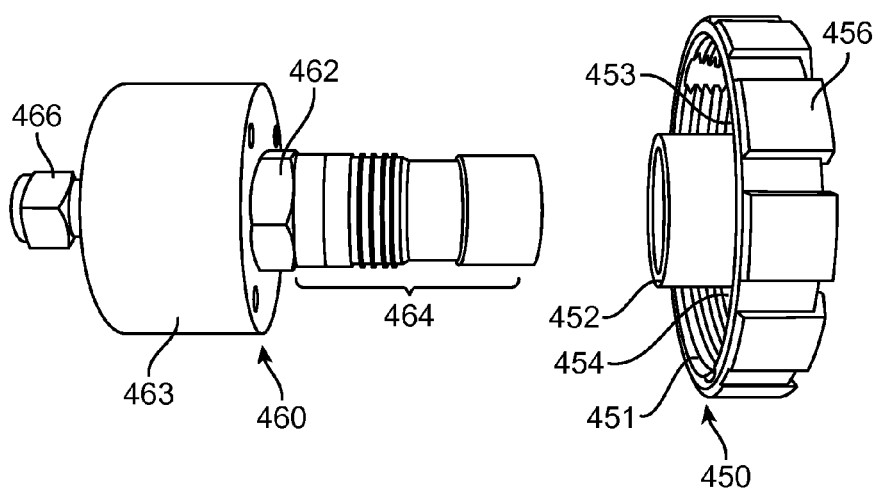
FIG. 4A shows an ignition disconnect fill cap and fill receptacle in accordance with an embodiment of the present invention.

FIG. 4A shows an ignition disconnect fill cap 450 and fill receptacle 460 without a fill neck attached (also referred to herein as an "inner receptacle") in accordance with the present invention. The fill neck may be provided separately. The fill cap 450 may or may not comprise an inner cap 452 made from, for example, a hard plastic material such as acetal, acetate, celluloid, resin, polystyrene or other plastic. The inner cap 452 may be suspended to an outer cap 456, made from the same materials as the inner cap 452 or, for example, a metallic material such as aluminum, stainless steel, brass or other metal. In some cases, the fill cap 450 may not include the inner cap 452. One or more actuators, triggers and/or magnets (collectively referred to herein as "indicators"), including, for example, portions of electric wire (not shown), may be provided on (e.g., embedded in or secured to) the outer cap 456. Alternatively, the one or more actuators/triggers/magnets (e.g., portions of electric wire) may be embedded in or secured to (e.g., fastened, screwed, bolted, glued, welded, soldered, or otherwise engaged with) the inner cap 452. In some cases, the one or more actuators/triggers/magnets (e.g., portions of electric wire) may be embedded in or secured to one or more of the following: the inner cap 452, to the outer cap 456, a support plate 454 or a seal 453. The one or more actuators/triggers/magnets (e.g., portions of electric wire) may be molded into, or attached on the fill cap 450 using screws, glue or adhesive, welded connections, solder, heat stakes or other fastening approaches known in the art. The actuators/triggers/magnets (e.g., electric wire) may or may not be exposed on the body of the fill cap 450. For example, the actuators/triggers/magnets (e.g., electric wire) may be fully contained within the fill cap 450 with electrical contacts accessible in one, two or more locations. The electrical contacts may be surface contacts, or may be provided as, for example, indents, buttons or jacks. When connected to the fill receptacle 460 and/or a fill neck (e.g., fill neck 361 in FIG. 3), the actuators/triggers/magnets (e.g., electric wire) embedded in or secured to the fill cap 450 may complete a control circuit or activate a read sensor or other system component capable of disconnecting a vehicle engine ignition system. The vehicle engine ignition system may be disconnected when an open circuit condition exists at the control circuit. For example, the electric wire may connect the control circuit with an engine starter motor directly, via a relay and/or via a signal from a controller. In such a configuration, upon interruption of the control circuit, the starter motor may not engage. The fill cap 450 may be formed of one, two or more parts. The parts may be formed of different materials, including, but not limited to, metals or metal alloys (e.g., steel, iron, aluminum, titanium, copper, brass, nickel, silver, or any alloys or combinations thereof), hard or soft plastics (e.g., acetal, acetate, celluloid, resin, polystyrene, rubber, all types of polymers, vinyls), or composite materials (e.g., carbon fiber, fiberglass). Alternatively, the fill cap may be formed as a single piece formed from any of these materials. For example, the fill cap 450 may be a single piece formed from metal (e.g, all brass), a single piece formed from acetate, a single piece formed from plastic etc.

Similarly to the fill cap 450, the fill neck (e.g., fill neck 361 in FIG. 3) and/or the fill receptacle 460 may comprise one, two or more separate pieces, which may, for example, be arranged concentrically. For example, the fill receptacle 460 may comprise a heavy-duty diesel-type or gasoline-type inner receptacle 464. Embodiments of the invention may include inner receptacles 464 with various diameters and corresponding fuel flow capacities, such as, for example, diameters (in inches) of more than, less than, or equal to about ⅛", ¼", ½", ¾", ⅝", 1", 1½", 2", 2½", 3", 4", 5", 6", 7" or more. Further, the fill receptacle 460 may comprise one or more fastening members, such as a bulkhead (through-hole) fitting 462 used to secure the fill receptacle to one or more walls, flanges or other structural components. Fastening members may also include other fittings, flanges, or connectors known in the art, one or more holding pieces, shells or fill manifolds 463 etc.

As described elsewhere herein, the fill receptacle 460 may also comprise an outer receptacle (also referred to herein as a "fill neck"). The fill neck may be separately formed. For example, the fill neck may be attached to a fuel tank cover, while the remainder of the fill receptacle 460, including the inner receptacle 464 (e.g., as shown in FIG. 4A), may be secured to the rest of the piping in a vehicle fuel tank fill system. The fill neck may or may not be attached to the inner receptacle and/or other pieces of the fill receptacle 460. For example, the fill receptacle of FIG. 4A may be supported by the rigidity its connection to the piping system, while the fill neck may surround the fill receptacle without mechanical contact between the two. Alternatively, the fill receptacle of FIG. 4A may be mechanically supported by and/or attached to the fill neck.

In some cases, a separate fill neck may not be used. Instead, the fill neck may be integrally formed with the inner receptacle 464 and/or other pieces of the fill receptacle 460. Thus, any description of features of the fill neck or the outer receptacle herein may also be applied to the inner receptacle and/or other pieces of the fill receptacle 460, and vice versa. A through hole or other transfer line/conduit may be provided at the fill receptacle 460 to allow fuel to be transferred from the fill receptacle to the fuel tank.

In some embodiments, the fill cap 450 may have one or more internal threads 451 that may mate with external threads of the fill receptacle, or a portion of the fuel tank cover. In one example, the inner cap 452 may mate with the inner receptacle 464 and the internal threads 451 may mate with an outer receptacle connector. In some embodiments, the inner cap and inner receptacle may form an inner connection via one or more threads, interlocking mechanisms, mating features, gaskets, seals, or other connection mechanisms. The inner cap and inner receptacle may press-fit with respect to one another. In some cases, as described in more detail elsewhere herein, the inner cap may not be used. Any of the connection mechanisms described herein with respect to the inner cap may also apply to connection mechanisms provided on the outer cap. Thus, the outer cap may, in some cases, replace at least a portion of the functionality of the inner cap. In some instances, the outer cap and outer receptacle may form an outer connection via one or more threads, interlocking mechanisms, gaskets, seals, or other connection mechanisms. The outer cap and outer receptacle may press-fit with respect to one another. The inner connection and the outer connection may be the same type of connection or different types of connections. In one example, an outer connection may have a screw-connection with mated threads while the inner connection may be a press-fit connection. As described elsewhere herein, various other connection types may be employed for the inner and/or outer connections, such as, for example, snap fits, quick connects, press-fits, magnetic connections, twist-locks, pins for locking in place, flip handles, collars, or any other secure mating connections.

Figure 4B:
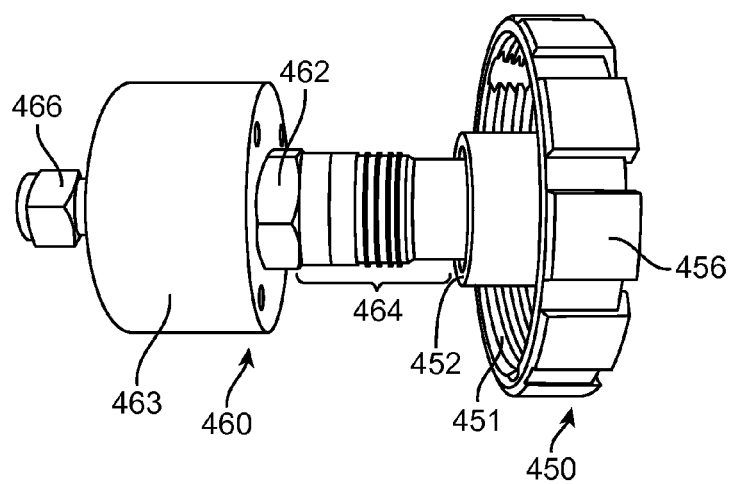
FIG. 4B shows positive placement of an ignition disconnect fill cap onto a fill receptacle.

FIG. 4B shows positive placement of the ignition disconnect fill cap 450 onto a fill receptacle 460. The inner receptacle 464 may be an off-the-shelf receptacle or a custom-made receptacle. For example, the receptacle may be specifically configured for handling a particular fuel, high pressure or other specific requirements. The inner receptacle 464 may also be designed to appropriately connect to a fuel supply nozzle and/or other fuel fill equipment. The fill cap 450 may easily be adapted to be received on any given type of inner receptacle 464. The inner cap 452 may be designed to receive and/or fit snugly onto a mating inner receptacle 464. As shown in FIGS. 4A-4B, the inner receptacle 464 may be outfitted with a threaded connection (or other connection type). A mating threaded connection may be provided on the inner cap 452 of the fill cap 450. Thus, a fill cap 450 may be attached to a fill receptacle 460 by multiple threaded or other connection mechanisms, such as the threaded connection between the inner cap 452 and the inner receptacle 464, and the outer cap 456 and an outer receptacle (not shown). As described elsewhere herein, one or more actuators/trigger/magnets, such as, for example, one or more portions of electric wire (not shown) may be provided in one or more locations on the fill cap 450. The control circuitry of the invention may require positive placement and secure connection to be sensed at multiple threaded (or other) connections in order not to trigger an ignition circuit disconnect condition. In some cases, the control circuitry may require an indicator (e.g., an actuator) to be within a given distance from an indicator receiver (e.g., a read sensor) in order not to trigger, for example, an ignition circuit disconnect condition, or a circuit change condition. For example, when the fill cap 450 is connected, the electric wire provided at the fill cap may be electrically connected to the control circuit via the fill neck. The fill neck may be outfitted with electric wire and/or may be made of an electrically conducting material. The fill neck may be in electronic communication with the control circuit. In another example, when the fill cap 450 is connected, the electric wire provided at the fill cap may be electrically connected to the control circuit at one or more other locations on the fill receptacle 460. Electrical connection of the fill receptacle 460 to the rest of the control circuit may be provided through any means of electrical connection known in the art.

The inner receptacle may be removably or permanently interconnected with one or more other parts of the fill receptacle 460. Any connection means known in the art and described in elsewhere herein may be used to assemble the fill receptacle 460. Further, the inner receptacle 464 may be connected to downstream components of a fuel tank fill system via any connection means known in the art, such as, for example, through a metal (e.g., stainless steel, carbon steel, brass) tube fitting 466 connected to standard pipe tubing downstream of the fill receptacle 460.

The fill receptacle 460 and/or its individual parts may be formed from a range of materials analogous to the fill cap 450. Thus, any description of materials used to form the fill cap 450 may also be applied to the fill receptacle 460 and/or the fill neck (e.g., fill neck 361 in FIG. 3). The fill cap 450, the fill receptacle 460 and/or the fill neck (e.g., fill neck 361 in FIG. 3) may each be assembled from multiple materials. The materials may be selected to allow interconnection between the fill cap and the fill receptacle, and between the fill receptacle and other parts of a vehicle fuel system (e.g., via the tube fitting 466). In some cases, the fill cap, the fill receptacle, the fill neck or a combination thereof may be made of the same material throughout (e.g., all brass).

Figure 4C:
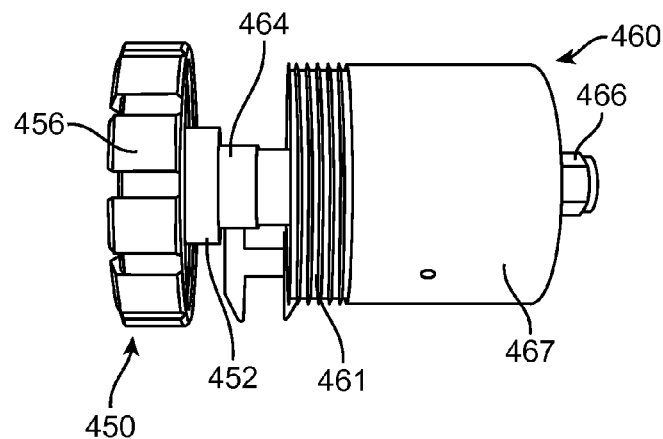
FIG. 4C is a side view of an ignition disconnect fill cap connected to a fill receptacle.

FIG. 4C is a side view of the ignition disconnect fill cap 450 partially connected to a fill receptacle 460, with the threads on the inner cap 452 engaged with the threads on the inner receptacle 464. Due to the positive placement provided herein, the fill cap may not fall off the fill receptacle because it may be screwed onto the fill neck of the fill receptacle attached to the vehicle's fuel system. Thus, a positive connection may be made and may ensure that the fill cap 450 may not fall off.

The fill receptacle 460 may be outfitted with an outer (threaded) receptacle or fill neck 461. The fill neck 461 may be formed of any suitable material described herein, such as, for example, aluminum metal. The fill neck may be integrated with a fuel tank cover (e.g., wound into a composite fuel tank cover) in order to provide a secure connection of the fill fuel receptacle to the vehicle's fuel system. In some cases, the fill neck 461 may be formed with an extended body 467, used to secure or fasten the fill neck 461 to the vehicle. Once the fill neck 461 is secured to the vehicle, as shown in FIG. 3, the threads on the outer cap 456 may be engaged with the threads on the fill neck 461, and the electric circuit through the fill cap 450 may be completed.

A further aspect of the invention relates to an ignition disconnect fill cap with a mating fill receptacle that are part of a fuel system on board a vehicle. The fill cap may comprise an indicator, such as, for example, any indicator described herein (e.g., an actuator, a trigger, a magnet, a wired connection, a proximity switch, or a combination thereof). When the fill cap is in proximity of an indicator receiver provided on a vehicle (e.g. on the fill neck, fill manifold, cover, faceplate etc.), the indicator provided on the fill cap may complete and/or activate a control circuit capable of affecting a response of a vehicle system. The response may be affected upon a change in circuit condition at the control circuit. For example, the response may be that of connecting, disconnecting, activating, sending a signal to, actuating and/or otherwise controlling a vehicle system (e.g., vehicle engine ignition system, one or more electronic control units and/or other systems on board the vehicle).

The fill cap may comprise one or more mating features. The mating features may be configured to be connected and separated with a complementary mating feature on a fill neck (also "outer receptacle" herein) of a fill receptacle. In some embodiments, the mating features may be configured to be connected and separated with a fill receptacle not having a fill neck, or having an integrated fill neck (e.g., an integrally formed fill neck, a non-separable fill neck etc.).

Figure 5A:
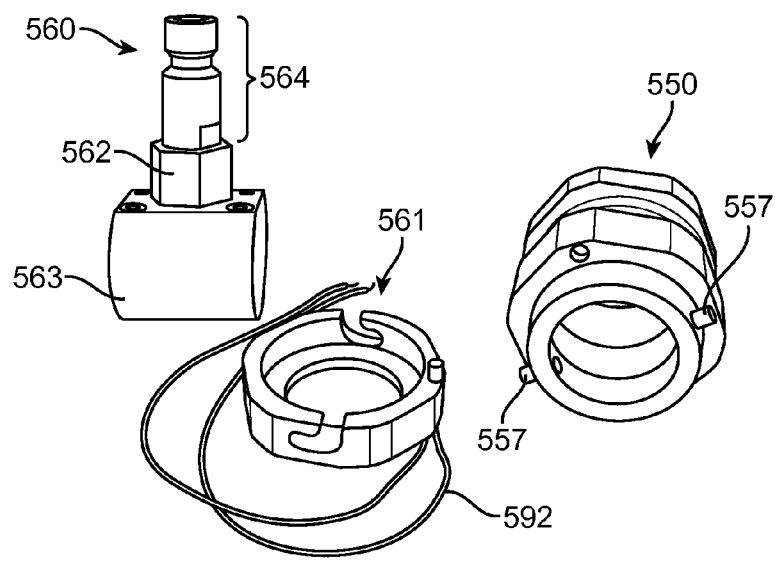
FIG. 5A shows an ignition disconnect fill cap, fill receptacle with fill neck and fill manifold in accordance with an embodiment of the present invention.

FIG. 5A shows an ignition disconnect fill cap 550, a fill receptacle 560 with fill neck 561 and a fill manifold 563. As described elsewhere herein, the fill cap may be made from, for example, a hard plastic material such as acetal, acetate, celluloid, resin, polystyrene or other plastic, a metallic material such as aluminum, stainless steel, brass or other metal. The fill cap may be integrally molded or formed from one or more separate pieces. In this embodiment, the fill cap may not comprise an inner and an outer portion inner cap portion; a single cap body may be used. The fill cap 550 may be formed with one or more mating features for attachment of the fill cap on a fill cap receiving region (e.g., the fill neck 561). The fill cap receiving region may have complementary mating features, such as, for example, any mating features described herein. For example, the fill cap 550 may have one or more pins 557 for mating with a complementary groove on the fill neck 561 (e.g., as shown in FIGS. 5A-5D). The fill cap and/or the fill cap receiving region may have one, two or more pins or latches (or other mating features) and one, two or more complementary slots (or other mating features). The mating features may be integral to the fill cap and/or the fill cap receiving region (e.g., the neck 561). Alternatively, the mating features may be provided separately on the fill cap and/or the fill cap receiving region. For example, the fill cap may have two pins that may be formed of a different material (e.g., metal) than the fill cap itself (e.g., hard plastic). The pins, latches or other mating features may be used to connect the fill cap to the fill neck 561 or to one or more alternative fill cap receiving regions. The mating features may allow for a twist-lock connection (e.g., the pins may snap into position inside the groove). The pins and/or the groove may be formed to facilitate engagement with complementary features and to allow a secure end position of the mating connection.

The fill receptacle may have an inner receptacle 564. The inner receptacle may be of any of the types described elsewhere herein. The inner receptacle may be attached or supported by the fill manifold 563. The inner receptacle may be in fluid communication with the fill manifold. The fill manifold may distribute one or more fuel flows from the receptacle to one or more locations in the fuel system. The fill manifold may have one or more outlets (not shown). The connection between the inner receptacle and the fill manifold may be provided by a fitting, such as, for example, a bulkhead (through-hole) fitting 562, or any other mechanical and/or fluid connector known in the art.

The fill cap may comprise an indicator, such as, for example, an actuator, a trigger, a magnet, or a combination thereof. The indicator may interact with an indicator receiver provided, for example, on the fill neck, on a cover, on the fill manifold, on a faceplate on a cover, or a combination thereof. For example, the fill cap 550 may comprise an indicator (not shown) that interacts with an indicator receiver, such as, for example, a read sensor 592 in the fill neck 561, as described in more detail elsewhere herein. The indicator receiver located in the fill neck may be part of one or more control circuits. For example, the indicator in the fill neck may be in electric communication with one or more control circuits one or more wired or wireless connections. The indicator receiver may be embedded in the fill neck, in the cover, in the fill manifold, in the faceplate, or a combination thereof.

Figure 5B:
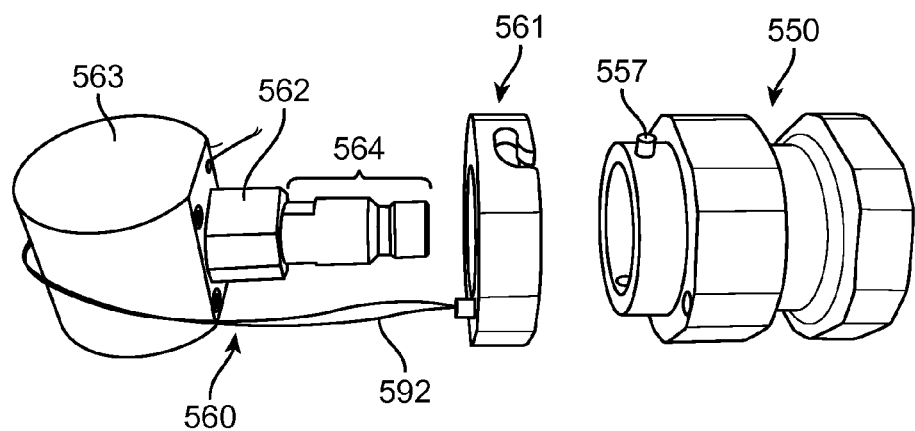
FIG. 5B is an exploded view of an assembly of an ignition fill cap, fill receptacle, fill neck and fill manifold.

FIG. 5B is an exploded view of an assembly of the ignition fill cap 550, the fill receptacle 560, the fill neck 561 and the fill manifold 563. The pins 557 on the fill cap 550 may be positioned such that they may engage with the grooves on the fill neck 561. The fill neck may be positioned such that the inner receptacle with the fitting 562 may slide through it, and the fill neck may be held in position and supported by the fill manifold 563. In some cases, the fill neck, the fill manifold and/or the fitting may have complementary mating shapes (e.g., a square or hexagonal inside/outside circumference). For example, the inside circumference of the fill neck may engage with the outside circumference of the fitting, thus preventing the fill neck from rotating in its position. Lateral motion of the fill neck may be prevented by the surface of the fill manifold. In some cases (see, for example, FIG. 6), the inside circumference may be formed by a protruding portion of the fill cap. The protruding portion may be similarly shaped to be complementary to one or more other components. The connections from the read sensor 592 may be positioned such that they do not interfere with positive placement of the fill cap 550, fill neck 561 and fill receptacle 560.

Figure 5C:
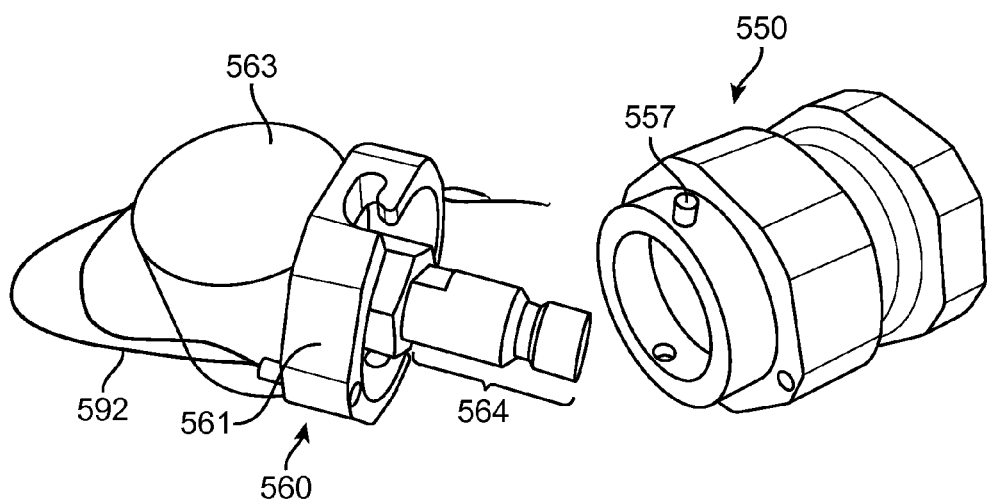
FIG. 5C shows an assembly of a fill receptacle, fill neck and fill manifold.

FIG. 5C shows an assembly of the fill receptacle 560, the fill neck 561 and the fill manifold 563. The fill neck may be attached to fill manifold. In some cases, one or more fasteners or other interlocking mechanisms may be used to securely attach the fill neck on the fill manifold. In some cases, one or more mating features used for positive placement of the fill cap onto the fill neck of the fill receptacle may also be used for positive placement of the fill neck onto the fill manifold (e.g., a dual groove may be used, wherein a first portion of the groove is for connecting the fill neck to the fill manifold, and a second portion of the groove is for connecting the fill cap to the fill neck). The read sensor 592 may be connected to one or more electronic systems on the vehicle.

Figure 5D:
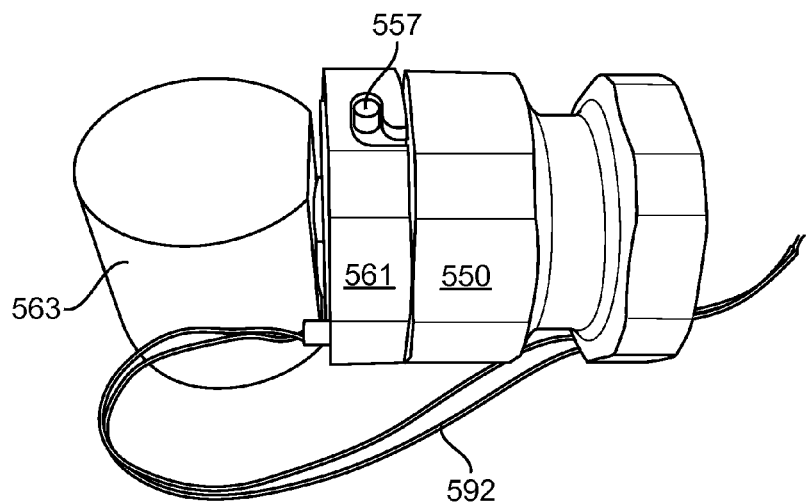
FIG. 5D shows positive placement of an ignition disconnect fill cap onto a fill receptacle with fill neck and fill manifold.

FIG. 5D shows positive placement of the ignition disconnect fill cap 550 onto the fill neck 561 of the fill receptacle. The pin(s) 557 may engage and lock into position, as shown, inside the groove(s) on the fill neck and fill manifold. This locking mechanism may prevent both axial and radial motion of the fill cap with respect to the fill neck. The fill manifold 563 may support the fill cap/fill neck assembly. The fill manifold may be in fluid communication with a fuel distribution system and/or other fuel system components. The read sensor 592 may be in electronic communication with one or more electronic or electromechanical systems in the fuel system or elsewhere on the vehicle.

Figure 6:
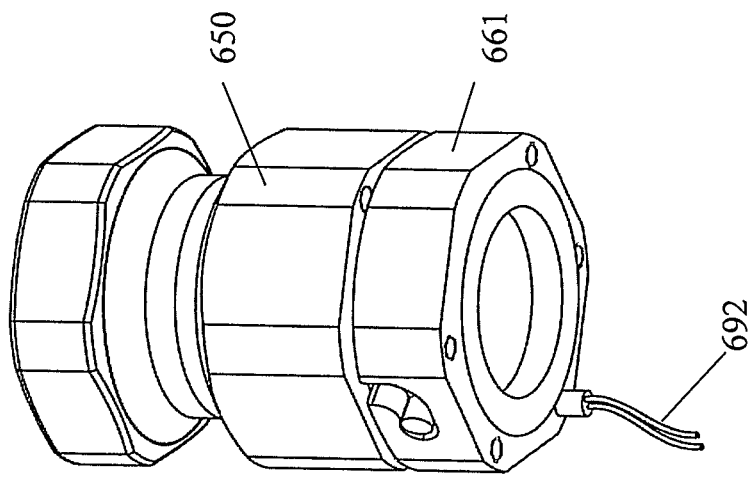
FIG. 6 are sectional and perspective views of an ignition disconnect fill cap connected with a fill neck with a read sensor.
Figure 6:
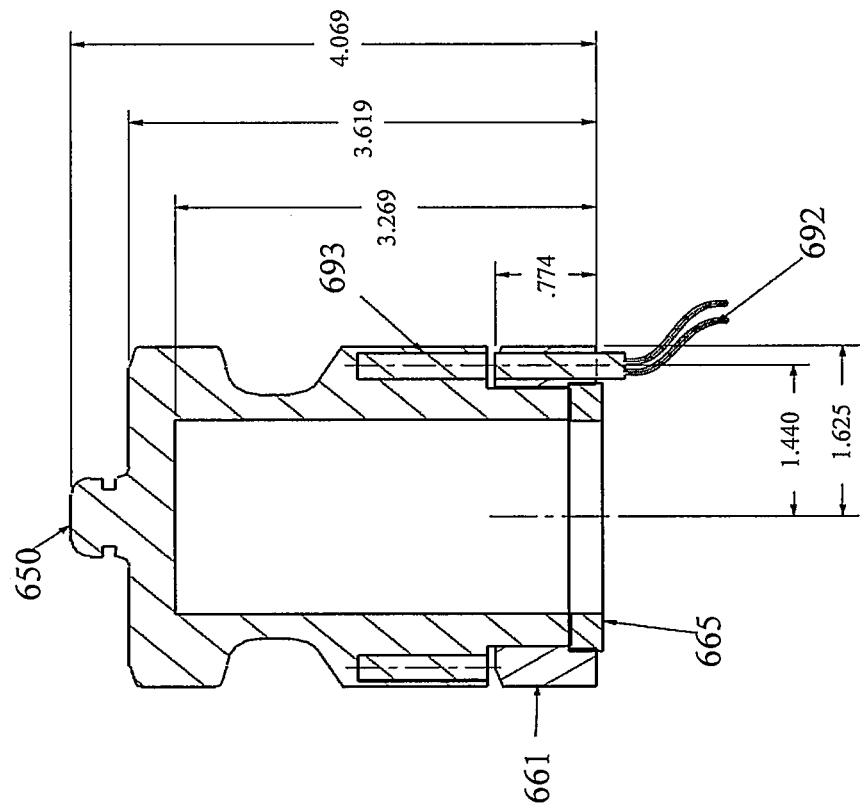

FIG. 6 are sectional and perspective views of an ignition disconnect fill cap 650 connected with a receptacle base attachment sleeve or fill neck 661. The fill cap may comprise an indicator such as, for example, a read sensor trigger 693. The fill neck may comprise an indicator receiver, such as, for example, a read sensor 692. The indicator may be secured in a hole or cavity in the fill cap (e.g., a cavity along the circumference of the fill cap). Alternatively, depending on type of indicator (i.e., ruggedness/sensitivity), the indicator may molded into the fill cap, glued into the fill cap, press-fit into an opening in the fill cap, etc. The indicator receiver may be secured in one or more holes or cavities, for example, using silicone. The indicator receiver may contain sensitive electronic circuitry. Thus, in some cases, it may be secured in the holes with silicone. Alternatively, if a more rugged type or design of the indicator receiver is used, it may be press-fit, molded, or otherwise secured into the fill neck. A gasket 665 may be provided between a portion of the fill cap that protrudes into the fill neck. The gasket may be placed between the fill cap and a support surface onto which the fill neck is seated (e.g., the fill manifold).

With continued reference to FIG. 6, the inside circumference formed by the protruding fill cap portion may be circular. In some cases, the inside circumference may have a given shape (e.g., hexagonal, irregular, etc.). Further, the fill cap and/or the fill neck may have a formed body. The body may have an irregular shape, a substantially circular circumference, a square/rectangular circumference etc. The shape of the fill cap and mating components may be shaped, grooved to facilitate operation of the fill assembly by a user.

In some embodiments, the indicator receiver may be activated or triggered only upon complete connection of the fill cap to the fill cap receiving region. In some embodiments, for example, when the indicator receiver is a read sensor, the read sensor may be activated or triggered when the fill cap with the indicator (e.g., an actuator, a trigger, a magnet, or a combination thereof) is placed within proximity of the read sensor. In some cases, the read sensor may be activated or triggered regardless of its location or mating engagement of the fill cap with the fill cap receiving region; i.e., the fill cap may or may not be at least partially connected to the fill cap receiving region (e.g., the fill neck). In some cases, sufficient proximity to activate or trigger the read sensor may not be achieved without at least partially engaging the fill cap with a mating portion on the fill cap receiving region. In some cases, the fill cap may need to be connected with the fill neck (or other fill cap receiving region, such as, for example, an alternative portion of the fill receptacle) in order to activate or trigger the read sensor.

The fill cap 650 may engage with the fill neck 661 to provide positive placement of the fill cap onto the fill neck of the fill receptacle, wherein mating feature(s) on the fill cap and complementary mating feature(s) on the fill neck of the fill receptacle form a secure connection, The connection may be a twist lock connection (e.g., using the pins and grooves), a press-fit connection (e.g., a quick-connect), a snap-fit connection, or any other type of connection. Thus, a positive connection may be made and may ensure that the fill cap does not fall off of the fill neck/fill receiver.

In some embodiments, the indicator(s) and indicator receiver(s) may not come in contact with the fuel being filled, thus eliminating risk of explosion. The ignition disconnect functionality provided by the devices, systems and methods herein thus offers safe monitoring of fuel fill processes.

Figure 7A:
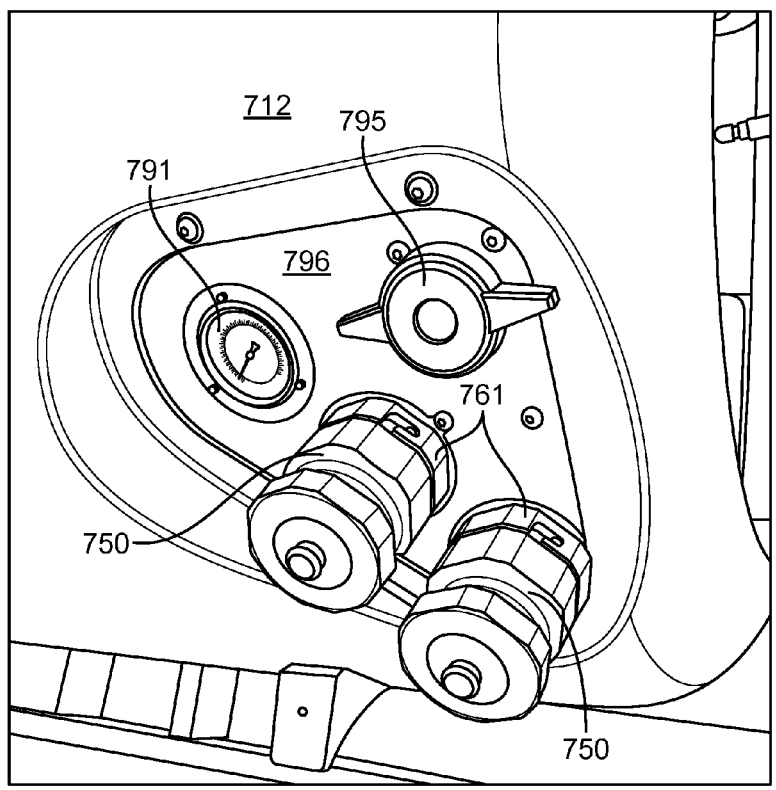
FIG. 7A is a photograph of a fuel tank cover with in accordance with an embodiment of the present invention.

FIG. 7A is a photograph of a fuel tank cover 712 in accordance with an embodiment of the present invention. The fuel tank cover may comprise a faceplate 796. One or more access points to a fuel system (e.g., the fuel system housed inside the cover) may be provided on the faceplate, including, for example, a ¼ turn (manual) shutoff valve 795, a pressure gauge 791, and one or more fill caps 750 removably connected to one or more mating fill necks 761 of one or more fill receptacles. The fill necks 761 may be attached to the faceplate 796 via, for example, a flanged connection and/or using one or more fasteners for connecting a fill manifold on a back side of the faceplate to a front side of the faceplate positioned on the surface of the cover, thereby squeezing the fill necks, which may be securely affixed to the fill manifolds, into place. Alternatively, any mating and/or other connecting means for connecting components described herein, or any other connecting or fastening means known in the art may be used to secure the fill necks to the faceplate.

Figure 7B:
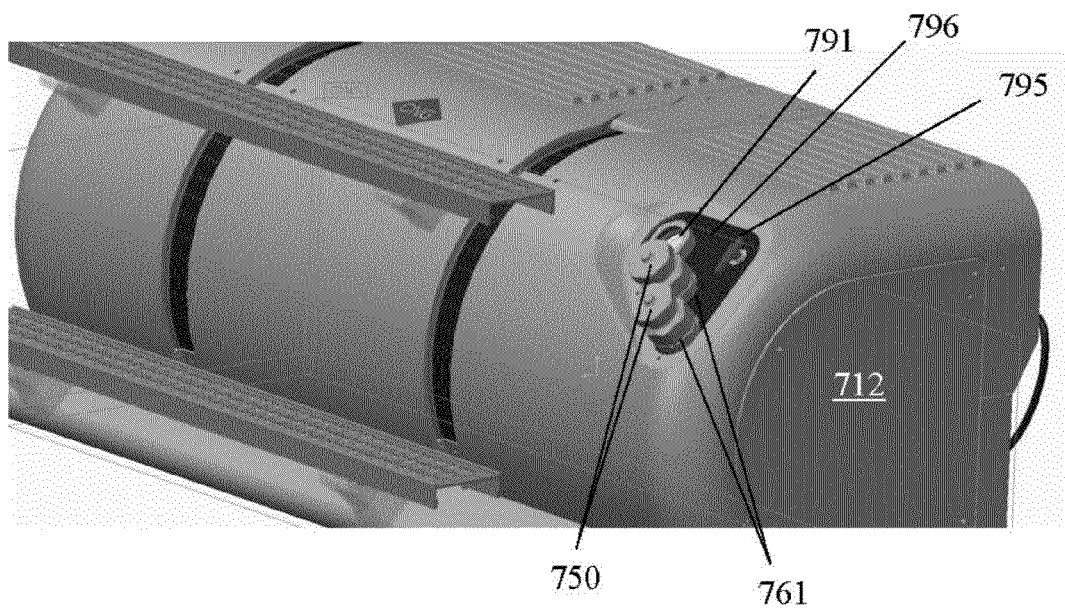
FIG. 7B is a perspective view of a fuel tank cover in accordance with an embodiment of the present invention.

FIG. 7B is a perspective view of the fuel tank cover 712 with the faceplate 796, the ¼ turn (manual) shutoff valve 795, the pressure gauge 791, and the one or more fill caps 750 removably connected to the one or more mating fill necks 761.

The invention may offer significant advantages with respect to existing options for fuel tank fill systems. The systems and methods herein may be advantageously applied to improve vehicle performance, functionality, reliability and safety.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A vehicle fuel tank fill cap comprising:
   an electrical contact provided on the fill cap; and
   a mating feature on the fill cap, wherein the mating feature on the fill cap is configured to be connected and separated in a controlled manner, by a vehicle operator, with a complementary mating feature on a fill cap receiving region which includes a fill neck of a fill receptacle at a vehicle; and
   an inner cap configured to receive or fit snugly onto an inner receptacle when the fill cap is connected with the fill neck of the fill receptacle, wherein the inner receptacle is configured for handling pressurized gaseous fuel,
   wherein the electrical contact provided on the fill cap completes, when the fill cap is connected with the fill neck of the fill receptacle, a control circuit by coming into contact with another electrical contact embedded in the fill cap receiving region, and
   wherein the control circuit is capable of disconnecting a vehicle engine ignition system when an open circuit condition exists at the control circuit.

2. The vehicle fuel tank fill cap of claim 1, wherein the mating feature on the fill cap is a female threaded connection and the complementary mating feature on the fill neck of the fill receptacle is a male threaded connection.

3. The vehicle fuel tank fill cap of claim 1, wherein the mating feature on the fill cap and the complementary mating feature on the fill neck of the fill receptacle form a twist-lock connection.

4. The vehicle fuel tank fill cap of claim 1, wherein the mating feature on the fill cap and the complementary mating feature on the fill neck of the fill receptacle include one or more of the following: flange, ledge, button, pin, bracket, latch, pin, receiving indent, lock, slot, snap, collar, clip, a cam lock, a pin, a clasp, or flip handle.

5. The vehicle fuel tank fill cap of claim 1, wherein the fill cap and the fill receptacle are configured to provide a press-fit connection.

6. The vehicle fuel tank fill cap of claim 1, wherein the electrical contact is an electric wire.

7. The vehicle fuel tank fill cap of claim 1, wherein the electrical contact is an actuator.

8. The vehicle fuel tank fill cap of claim 1, wherein the electrical contact is a trigger.

9. The vehicle fuel tank fill cap of claim 1, wherein the electrical contact is a magnet.

10. The vehicle fuel tank fill cap of claim 1, wherein the electrical contact is embedded in the fill cap.

11. The vehicle fuel tank fill cap of claim 1, wherein the electrical contact is secured to the fill cap.

12. The vehicle fuel tank fill cap of claim 1, wherein the other electrical contact embedded in the fill neck is embedded within a hole or cavity of the fill neck and does not extend out of the hole or cavity.

13. The vehicle fuel tank fill cap of claim 1, wherein the control circuit is located inside of a fuel tank fill system.

14. The vehicle fuel tank fill cap of claim 13, wherein the control circuits include electrical connections to the other electrical contact that is not exposed outside the fill neck.

15. A vehicle fuel tank fill cap of a vehicle comprising:
   an electrical contact provided on the fill cap;
   a mating feature on the fill cap, wherein the mating feature on the fill cap is configured to be connected and separated in a controlled manner, by a vehicle operator, with a complementary mating feature on a fill neck of a fill receptacle at a vehicle; and
   an inner cap configured to receive or fit snugly onto an inner receptacle when the fill cap is connected with the fill neck of the fill receptacle, wherein the inner receptacle is configured for handling pressurized gaseous fuel,
   wherein the electrical contact provided on the fill cap completes and/or activates, when the fill cap is in proximity of another electrical contact provided on the vehicle independent of whether the fill cap is at least partially connected to the fill neck, a control circuit, and
   wherein the control circuit is capable of affecting a response of a vehicle system upon a change in circuit condition at the control circuit.

16. The vehicle fuel tank fill cap of claim 15, wherein the fill cap is in proximity of the electrical contact provided on the vehicle when the fill cap is connected with the fill neck of the fill receptacle.

17. The vehicle fuel tank fill cap of claim 15, wherein the response is disconnecting a vehicle engine ignition system.

18. The vehicle fuel tank fill cap of claim 15, wherein the change in circuit condition is a change from a closed circuit condition' to an open circuit condition.

19. The vehicle fuel tank fill cap of claim 15, wherein the other electrical contact is provided on the fill neck, a cover, a fill manifold, a faceplate, or a combination thereof.

20. The vehicle fuel tank fill cap of claim 15, wherein the other electrical contact is a read sensor.

21. The vehicle fuel tank fill cap of claim 15, wherein the electrical contact is an actuator, a trigger, a magnet, or a combination thereof.

22. The vehicle fuel tank fill cap of claim 15, wherein the electrical contact provided on the fill cap completes and/or activates when the fill cap is not mating with the fill neck.

23. A vehicle fuel tank fill system comprising:
(a) the vehicle fuel tank fill cap of claim 1;
(b) the fill cap receiving region, wherein the fill cap receiving region comprises the other electrical contact embedded therein;
(c) the inner receptacle configured for handling the pressurized gaseous fuel, wherein the inner receptacle is configured to provide controlled fluid communication to a fuel tank capable of storing the pressurized gaseous fuel at pressures of at least 100 psig.

24. The system of claim 23, wherein the inner receptacle provides controlled fluid communication with the tank through one or more high pressure seal, valve, or compression device.

25. The system of claim 24, wherein the inner receptacle provides controlled fluid communication with the tank through one or more check valves.

26. The system of claim 23, wherein the inner receptacle is connected to a pressure manifold one or more gas inlets or outlets to one or more locations within the system.

27. The system of claim 26, wherein the one or more locations include fill receptacles fuel tanks, or engine manifold inlets.

\* \* \* \* \*